(12) United States Patent
Ashirvad et al.

(10) Patent No.: US 11,481,208 B2
(45) Date of Patent: Oct. 25, 2022

(54) SOFTWARE PATCH DIFFERENCE DEVICES

(71) Applicant: Hewlett-Packard Development Company, L.P., Spring, TX (US)

(72) Inventors: Shakti Ashirvad, Spring, TX (US); Gaurav Sujit Roy, Spring, TX (US); Juan M. Venegas, III, Spring, TX (US); Ronnie Glenn Blewer, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/262,542

(22) PCT Filed: Nov. 30, 2018

(86) PCT No.: PCT/US2018/063423
§ 371 (c)(1),
(2) Date: Jan. 22, 2021

(87) PCT Pub. No.: WO2020/112144
PCT Pub. Date: Jun. 4, 2020

(65) Prior Publication Data
US 2021/0357205 A1 Nov. 18, 2021

(51) Int. Cl.
*G06F 8/65* (2018.01)
*G06F 8/658* (2018.01)
*H04L 9/32* (2006.01)

(52) U.S. Cl.
CPC ............ *G06F 8/658* (2018.02); *H04L 9/3236* (2013.01)

(58) Field of Classification Search
CPC .......... G06F 8/658; G06F 8/71; G06F 9/5066; G06F 9/5077; G06F 21/123;
(Continued)

(56) References Cited

U.S. PATENT DOCUMENTS 6,493,871 B1 12/2002 Mcguire et al.
7,376,945 B1 5/2008 Kakumani et al.
(Continued)

FOREIGN PATENT DOCUMENTS

CN 106940673 A 7/2017
WO 2002/065702 A1 8/2002

OTHER PUBLICATIONS

M. Boldt, B. Carlsson and R. Martinsson, "Software Vulnerability Assessment Version Extraction and Verification," International Conference on Software Engineering Advances (ICSEA 2007), 2007, pp. 59-59, doi: 10.1109/ICSEA.2007.64. (Year: 2007).*
(Continued)

*Primary Examiner* — Hanh Thi-Minh Bui
(74) *Attorney, Agent, or Firm* — Perry + Currier Inc

(57) ABSTRACT

An example software patch difference device includes a processor to: receive current software version indicators of software installed at monitored devices; generate, using a cryptographic function, respective identifiers of the current software version indicators for the monitored devices; retrieve, from storage, respective previous identifiers of previous software version indicators of the software installed at the monitored devices, the respective previous identifiers generated using the cryptographic function; compare, for the current software version indicators, a respective identifier with a respective previous identifier; when a difference is determined therebetween for a given device: replace, at the storage, respective previous software version indicators for the given device with respective current software version indicators; and transmit, to an analytics device, a respective software change indicator of the given device, to trigger the analytics device to generate a report indicating statistics for respective software versions installed at the monitored devices.

15 Claims, 10 Drawing Sheets

(58) Field of Classification Search
CPC ........ G06F 21/305; G06F 21/33; G06F 21/44;
G06F 21/552; G06F 21/602; G06F
21/6209; G06F 21/64; G06F 21/57; G06F
21/54; G06F 21/4881; G06F 2209/541;
G06F 2209/54; H04L 9/08; H04L 9/0822;
H04L 9/0819; H04L 9/0866; H04L
9/3236; H04L 9/3239; H04L 9/3242;
H04L 9/083268
See application file for complete search history.

(56) References Cited

U.S. PATENT DOCUMENTS

| | | | |
|---|---|---|---|
| 7,552,430 | B2 | 6/2009 | Napier et al. |
| 7,913,246 | B2 | 3/2011 | Hammond et al. |
| 8,185,619 | B1 | 5/2012 | Maiocco et al. |
| 8,423,993 | B2 | 4/2013 | Faus et al. |
| 9,176,728 | B1 | 11/2015 | Dixit et al. |
| 9,471,455 | B2 | 10/2016 | Horn et al. |
| 9,542,172 | B2 | 1/2017 | Alsina et al. |
| 9,606,793 | B1 | 3/2017 | Magnezi et al. |
| 9,661,103 | B2 | 5/2017 | Luna et al. |
| 2005/0144616 | A1 | 6/2005 | Hammond et al. |
| 2006/0080656 | A1 | 4/2006 | Cain et al. |
| 2009/0100272 | A1 | 4/2009 | Smeets |
| 2011/0131565 | A1* | 6/2011 | Vidal ................. G06F 9/44536 717/175 |
| 2011/0225575 | A1 | 9/2011 | Ningombam et al. |
| 2012/0331439 | A1 | 12/2012 | Zimmermann et al. |
| 2013/0227517 | A1 | 8/2013 | Fox et al. |
| 2013/0263104 | A1 | 10/2013 | Baset et al. |
| 2013/0318601 | A1 | 11/2013 | Thorley et al. |
| 2014/0259018 | A1 | 9/2014 | Jain |
| 2016/0092210 | A1 | 3/2016 | Kuchibhotla et al. |
| 2016/0266885 | A1 | 9/2016 | Aleksandrov et al. |
| 2017/0034023 | A1 | 2/2017 | Nickolov et al. |
| 2019/0155591 | A1 | 5/2019 | Kumar et al. |
| 2020/0073650 | A1* | 3/2020 | Peschansky ........ H04L 67/2814 |

OTHER PUBLICATIONS

"How to Update Your Software," GCF Global (edu.gcfglobal.org) website, retrieved at https://edu.gcfglobal.org/en/basic-computer-skills/how-to-update-your-software/1/, Jul. 27, 2018, 5 pages.

Roquero, P., et al., "On Performance and Scalability of Cost-Effective SNMP Managers for Large-Scale Polling," IEEE Access, vol. 9, 2021, pp. 7374-7383.

* cited by examiner

SOFTWARE PATCH DIFFERENCE DEVICES

BACKGROUND

Software and/or applications are released on a regular basis, including patches and/or updates and/or new versions of operating systems and software applications. Many of these patches, and the like, have important functionality and security fixes.

BRIEF DESCRIPTION OF THE DRAWINGS

Reference will now be made, by way of example only, to the accompanying drawings in which.

DETAILED DESCRIPTION

Figure 1:
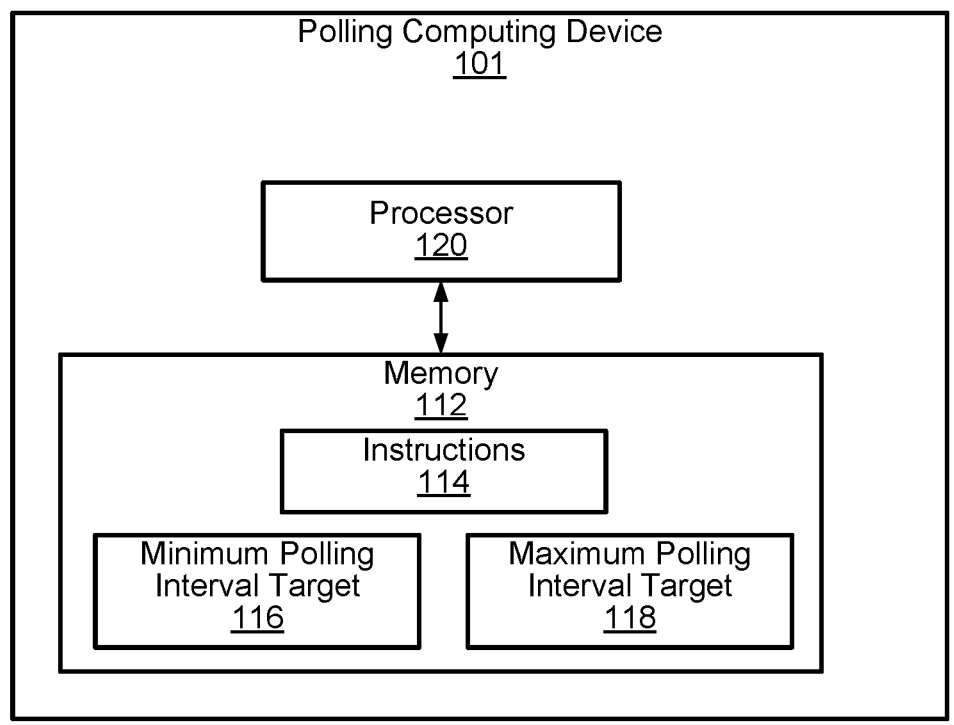
FIG. 1 is a block diagram of an example polling computing device.

Software and/or applications are released on a regular basis, including patches and/or updates and/or new versions of operating systems and applications. Many of these patches, and the like, have important functionality and security fixes. However, on devices, older versions of software and/or applications are initially installed, and patches may not be installed in a timely manner. Furthermore, tracking whether patches are installed can become unwieldy in a company which may track hundreds of applications on thousands of devices. When such tracking and/or application updating is outsourced, for example in Device-as-a-Service (DaaS) environments, the tracking and/or software updating may be for thousands of applications on millions of devices, which becomes even more unwieldy as each application may have ten to fifteen, or more, active versions across different devices and/or different companies.

The present disclosure is directed to a system that includes a polling computing device (e.g. a first server) to poll monitored devices to receive current software version indicators of software installed at monitored devices. The polling computing device may poll the monitored devices using polling threads and/or virtual machines, which may be increased or decreased to adjust a polling rate to align an interval time with, and/or be close to, a minimum polling interval for the monitored devices. Furthermore, the monitored devices may be polled once per a given time period, such as once per day, once per week, and the like. The polling computing device generally provides the current software version indicators of software installed at monitored devices to a software patch difference engine. As the number of the monitored devices may be in the millions, it can be important to poll the monitored devices as quickly as possible; however, when the monitored devices are polled too quickly, processing resources at the monitored devices may be overwhelmed by the polling, which may cause a CPU (central processing unit) burst, and the like, which could interrupt services at the monitored device and/or be noticeable to a user of a monitored device and/or. Hence, by adjusting a polling rate to align an interval time with, and/or be close to, a minimum polling interval for the monitored devices, the polling computing device polls the monitored devices as quickly as possible without, for example, causing a CPU burst, and the like.

The system further includes a software patch difference device (e.g. a second server) which receives the current software version indicators from the polling computing device. The software patch difference device determines which of the monitored devices have been updated since a last poll based on the current software version indicators. The software patch difference device transmits, to a software patch analytics device, respective software change indicators for the monitored devices that have been updated since the last poll. For example, the software patch difference engine may use a cryptographic function, such as a hash function, to produce respective identifiers of the current software version indicators for the monitored devices (e.g. the current software version indicators are hashed) and compares the respective identifiers of the current software version indicators with previous identifiers of previous software version indicators of the software installed at the monitored devices (e.g. also produced using the cryptographic function and/or hash function). In this manner, the software patch difference device determines which of the monitored devices have been updated since a last poll and provides the current software version indicators to the software patch analytics device. In general, information for the monitored devices that have not been updated since the last poll may not, or are not, transmitted to the application patch analytics device. Hence, the software patch analytics device is not provided with information for all the monitored devices so that the software patch analytics device may operate more efficiently. For example, as the number of the monitored devices may be in the millions, but the number of monitored devices that received software updates since a last poll may be only a small fraction of the total number of the monitored devices, the software patch difference engine filters the information transmitted to the software patch analytics device so as to not overwhelm processing resources of the software patch analytics device.

The system further includes a software patch analytics device (e.g. a third server) which receives, from the software patch difference device, the respective software change indicators for the monitored devices that have been updated since the last poll. The software patch analytics device then generates a report indicating statistics for respective software versions of the software installed at the monitored devices. The generated report may be used to cause, and/or to automatically cause, the software installed at the monitored devices to be automatically updated with available software versions, for example via a software update device. As the number of the monitored devices may be in the millions, and as the software patch analytics device receives software change indicators for the monitored devices that have been updated since the last poll, the processing resources of the software patch analytics device are not overwhelmed and allow the software patch analytics device to quickly and efficiently provide reports that enable a software update device to quickly effect software updates.

While the term "software" is used herein, the term is understood to include applications installed at monitored devices to which updates and/or patches (and the like) are being applied, for example to configure respective memories and/or respective processors at the monitored devices to perform the functionality of the applications, for example as updated and/or according to the patches, and the like.

Referring to FIG. 1, a polling computing device 101 to poll monitored devices is depicted schematically. The polling computing device 101 comprises: a memory 112 storing instructions 114, a minimum polling interval target 116 and a maximum polling interval target 118. The polling computing device 101 further comprises a processor 120 connected to the memory 112, the processor 120 to execute the instructions 114. The instructions 114 control the processor 120 to: determine an interval time to poll a monitored device in a queue of the monitored devices based on a current processing time of a given monitored device being polled, and an average processing time for previously polled monitored devices. The instructions 114 further control the processor 120 to: adjust a polling rate such that the interval time is between the minimum polling interval target 116 and the maximum polling interval target 118. The instructions 114 further control the processor 120 to: poll the monitored devices in the queue according to the polling rate. The instructions 114 further control the processor 120 to: receive, in response to the poll, from the monitored devices in the queue, current software version indicators of software installed at the monitored devices. The instructions 114 further control the processor 120 to: transmit, to a software patch difference device, the current software version indicators, the software patch difference device to determine which of the monitored devices have been updated since a last poll based on the current software version indicators.

For example, the polling computing device 101, may comprise a server, a cloud computing device, and the like, in communication with the monitored devices, and the software patch difference device, via communication networks and the like. Hence, while not depicted, the polling computing device 101 may comprise a communications interface, and the like, to communicate with communication networks.

Furthermore, the polling computing device 101 may communicate with the monitored devices via applications and/or polling applications installed at the monitored devices. The applications and/or polling applications may be third party applications and/or polling applications installed at the monitored devices by an entity different from the entity operating the polling computing device 101. Indeed, in some examples, the instructions 114 are further to: communicate with the monitored devices via an applications programming interface (API) of a polling application installed at the monitored devices.

The memory 112 is coupled to the processor 120 and includes a non-transitory machine-readable storage medium that may be any electronic, magnetic, optical, or other physical storage device. The non-transitory machine-readable storage medium of the memory 112 may include, for example, random access memory (RAM), electrically-erasable programmable read-only memory (EEPROM), flash memory, a storage drive, an optical disc, and the like. The memory 112 may also be encoded with executable instructions to operate and other hardware in communication with the processor 120 (e.g. such as a communications interface).

In other examples, it is to be appreciated that the memory 112 may be substituted with a cloud-based storage system.

The memory 112 may also store an operating system that is executable by the processor 120 to provide general functionality to the polling computing device 101, for example, functionality to support various applications such as a user interface to access various features of the polling computing device 101. Examples of operating systems include a Real-Time Operating System (RTOS), Windows™, macOS™, iOS™, Android™, Linux™, and Unix™. The memory 112 may additionally store applications that are executable by the processor 120 to provide specific functionality to the polling computing device 101, such as those described in greater detail below and which may include the instructions 114.

The processor 120 may include a central processing unit (CPU), a microcontroller, a microprocessor, a processing core, a field-programmable gate array (FPGA), or similar. The processor 120 and memory 112 may cooperate to execute various instructions such as the instructions 114.

In particular, the processor 120 may operate a plurality of virtual machines and/or a plurality of polling threads (e.g. at the virtual machines) to poll the monitored devices. The polling rate may be adjusted by adjusting a number of polling threads used to communicate with the monitored devices in the queue. For example, the number of polling threads may be increased to decrease the polling rate while the number of polling threads may be decreased to increase the polling rate.

For example, the instructions 114 may further control the processor 120 to: when the interval time is less than the minimum polling interval target 116, decrease the number of the polling threads until the polling rate causes the interval time to equal to the minimum polling interval target 116 plus a buffer time.

Similarly, the instructions 114 may further control the processor 120 to: when the interval time is greater than the maximum polling interval target 118, increase the number of the polling threads until the polling rate causes the interval time to equal to the minimum polling interval target 118 plus a buffer time.

However, in some examples, the instructions 114 may further control the processor 120 to: poll the monitored devices in the queue according to the polling rate and a buffer time. Hence, for example, a buffer time may be introduced to slow the polling rate.

In yet further examples, the instructions 114 may further control the processor 120 to: communicate with a list and/or lists of the monitored devices to generate the queue of the monitored devices. For example, the list and/or lists may include lists of the monitored devices for different companies that deployed the monitored devices; the companies may have engaged an entity operating the polling computing device 101 in a Device-as-a-Service (DaaS) environment to maintain the monitored devices. The list and/or lists may include company identifiers associated with the monitored devices.

Figure 2:
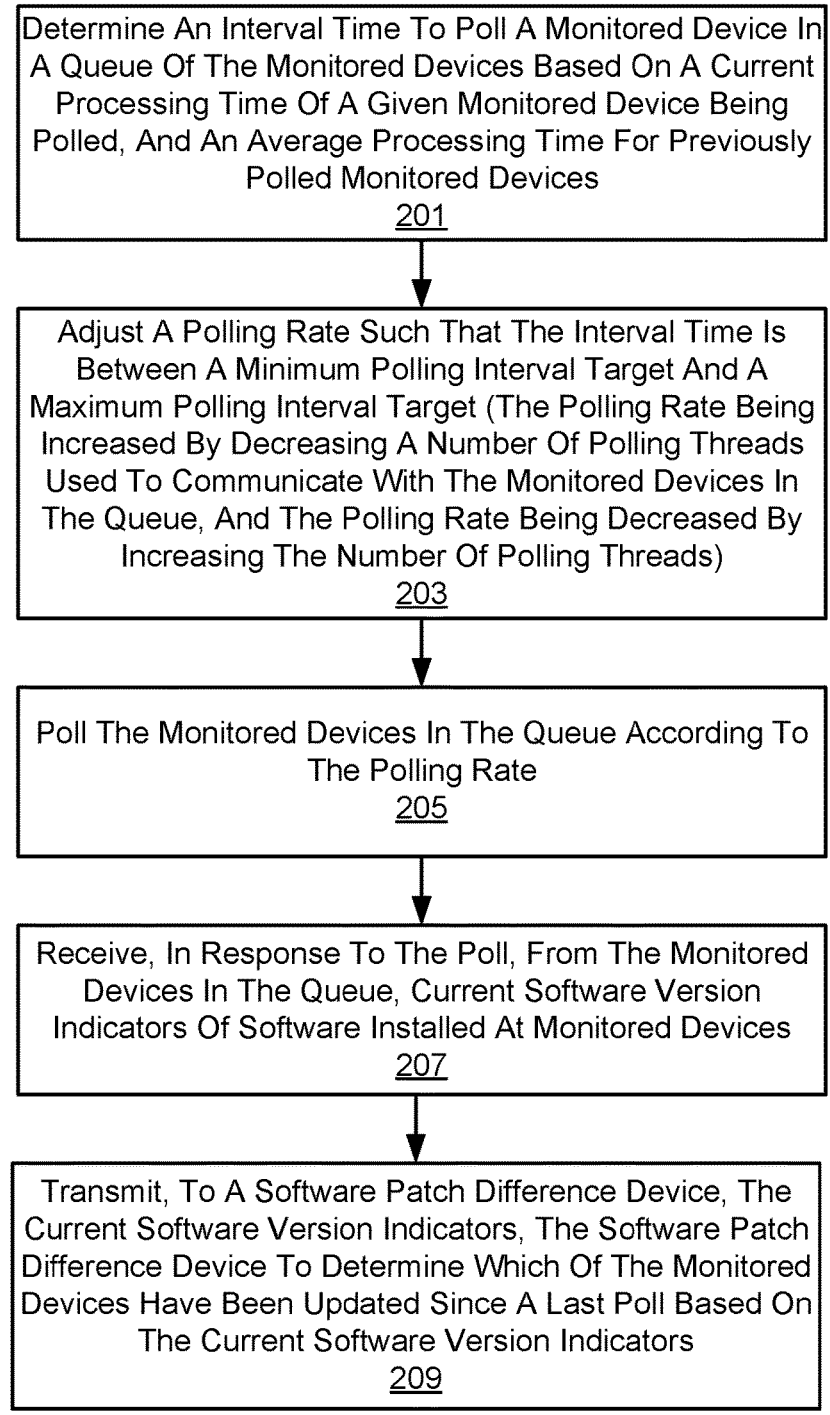
FIG. 2 is a flowchart of an example method to poll monitored devices for current software version indicators.

Referring to FIG. 2, a flowchart of a method 200 to poll monitored devices is depicted. In order to assist in the explanation of method 200, it will be assumed that method 200 may be performed with the polling computing device 101, and specifically by the processor 120 implementing the instructions 114. Indeed, the method 200 may be one way in which the polling computing device 101 polls monitored devices. Furthermore, the following discussion of method 200 may lead to a further understanding of the processor 120, the polling computing device 101 and its various components. Furthermore, it is to be emphasized, that method 200 may not be performed in the exact sequence as shown, and various blocks may be performed in parallel rather than in sequence, or in a different sequence altogether.

Beginning at a block 201, the polling computing device 101 determines an interval time to poll a monitored device in a queue of monitored devices based on a current processing time of a given monitored device being polled, and an average processing time for previously polled monitored devices.

The queue may be determined by communicating with a storage device and/or storage devices that store lists of the monitored devices. For example, the polling computing device 101 may poll monitored devices for a plurality of companies and the lists of the monitored devices may include a respective list for each company. The queue may be generated from this list, with the queue indicating an order in which the monitored devices are to be polled. The number of the monitored devices may be in the hundreds, thousands, or millions, and the like.

Furthermore, the queue may change to remove or add monitored devices. For example, monitored devices may be removed when such monitored devices are removed from the lists (e.g. unenrolled from being monitored) or added to the lists (e.g. enrolled to be monitored). Removal may occur as monitored devices are decommissioned, and/or a company operating monitored devices disengages from DaaS services of the entity operating the polling computing device 101. Similarly, addition may occur as monitored devices are commissioned, or a company operating devices engages DaaS services of the entity operating the polling computing device 101

In some examples, an interval time to poll a monitored device may be a time between a first poll of a given monitored device in the queue and a second poll of the given monitored device, for example after the other monitored devices in the queue are polled. In general, the interval time is controlled to be between the minimum polling interval 116 (such that the monitored devices are not polled too often and/or to prevent CPU bursts at the monitored devices) and the maximum polling interval 118 (such that the monitored devices are not polled too slowly).

The interval time may be determined by first determining a current processing time of a monitored device being polled for a single polling thread, which may be added to a previous total processing time for previously polled devices on the single polling thread. The previous total processing time may be determined by multiplying the average processing time for previously polled monitored devices by a number of the previously polled monitored devices.

The total of this summation (e.g. current processing time plus previous total processing time) may be divided by the number of the previously polled monitored devices plus "one" (e.g. the number of the previously polled monitored devices plus the "one" currently polled monitored device). Hence, for example a moving average of a processing time for polling the monitored device at a single polling thread may be determined at the polling computing device 101.

Furthermore, the moving average of the processing time may be for all the polling threads used to poll the monitored devices. For example, the polling computing device 101 may operate a plurality of virtual machines, each of which may operate a plurality of polling threads, to communicate with an application and/or polling applications at the monitored devices to request current software version indicators of software installed at the monitored devices. The polling threads are generally used to poll the monitored devices in parallel.

Hence, in some examples, a processing time per thread may be determined by dividing the average and/or moving average of the processing time by the number of polling threads. The interval time may hence be determined by multiplying the processing time per thread by the total number of the monitored devices to be polled.

The interval time generally indicates an interval time between processing a single monitored device twice (e.g. the time between polling a monitored device once, then polling all the other monitored devices in the queue, and again polling the monitored device), with a given number of polling threads. The interval time may change when the number of the monitored devices changes. The interval time may be controlled by controlling the number of polling threads.

At a block 203, the polling computing device 101 adjusts a polling rate for polling the monitored devices such that the interval time is between the minimum polling interval target 116 and the maximum polling interval target 118, for example as stored in the memory 112. In other words, the interval time should be controlled to be greater than the minimum polling interval target 116 and less than the maximum polling interval target 118.

In some examples, the minimum polling interval target 116 may be determined by communicating with the application and/or polling application at the monitored devices. The application and/or polling application may provide a maximum allowable number of polling requests (e.g. per second) to the polling computing device 101 which may be used to determine the minimum polling interval target 116. For example, the maximum allowable number of polling requests generally indicates how fast a monitored device may be polled, which may be used to determine the minimum polling interval target 116. Once the maximum allowable number of polling requests is received, the minimum polling interval target 116 may be determined and preconfigured at the memory 112. However, in other examples, the minimum polling interval target 116 may be determined heuristically and preconfigured at the memory 112.

In some examples the maximum polling interval target 118 may be predetermined by an administrator of the system. In yet further examples, the maximum polling interval target 118 may be based on the total number of monitored devices, and so forth. The maximum polling interval target 118 may further indicate how often the monitored devices are to be polled. For example, when the monitored devices are to be polled once per day, the maximum polling interval target 118 may be set to twenty-four hours.

In some examples, at the block 203, the polling computing device 101 adjusts the polling rate by adjusting the number of polling threads used to communicate with the monitored devices in the queue. In particular, when the interval time is less than the minimum polling interval target 116, the number of the polling threads may be decreased until the polling rate causes the interval time to equal to the minimum polling interval target 116 plus a buffer time. Similarly, when the interval time is greater than the maximum polling interval target 118, the number of the polling threads may be increased until the polling rate causes the interval time to equal to the minimum polling interval target 116 plus a buffer time. In general, the number of polling threads are adjusted to align with the minimum polling interval target 116 (e.g. plus a buffer time) to poll the monitored devices as quickly as possible while reducing the possibility of a CPU burst, and the like, at the monitored devices.

In some examples, the number of polling threads are adjusted such that the interval time is at about a given percentage higher than the minimum polling interval target 116, for example about 10% higher, and the like.

In yet further examples, once the monitored devices in the queue are polled once, polling may end, and may be repeated after a given time period. For example, the polling computing device 101 may poll the monitored devices once per day, once per week, and the like.

At a block 205, the polling computing device 101 polls the monitored devices in the queue according to the polling rate. Such polling may include, prior to polling, retrieving, from a key management device, cryptographic keys for decrypting data received from the monitored devices.

At a block 207, the polling computing device 101 receives, in response to the poll, from the monitored devices in the queue, current software version indicators of software installed at the monitored devices. In particular polled monitored devices may transmit, to the polling computing device 101, a respective name and a respective version number, and the like, of software applications installed thereon, including, but not limited to, software patches installed at the monitored devices. Hence the current software version indicators of software installed at a given monitored device may comprise a list of respective names and respective version numbers for software applications and/or software patches, and the like, installed at the given monitored device. The current software version indicators hence represent a snapshot of the software and/or applications installed at the monitored devices.

Furthermore, in some examples, the current software version indicators may be received in an encrypted format, which may be decrypted at the polling computing device 101 via the cryptographic keys received from the key management device.

At a block 209, the polling computing device 101 transmits, to a software patch difference device, the current software version indicators, the software patch difference device to determine which of the monitored devices have been updated since a last poll based on the current software version indicators.

In some examples, at the block 209, the current software version indicators may be transmitted with device identifiers of the monitored devices (e.g. a device identifier of a given monitored device may be transmitted with the current software version indicators for the given monitored device, the device identifiers being used in the queue). Device identifiers may include, but are not limited to, a device name (e.g. an assigned alphanumeric name), a Media Access Control (MAC) address, a serial number, and the like.

In yet further examples, at the block 209, the current software version indicators may be transmitted with company identifiers associated with the monitored devices (e.g. a company identifier associated with a given monitored device may be transmitted with the current software version indicators for the given monitored device). Company identifiers may include, but are not limited to, a company name (e.g. an alphanumeric name), an alphanumeric identifier (e.g. an assigned reference number), and the like, and which may be received with the device identifier, as described above.

Figure 3:
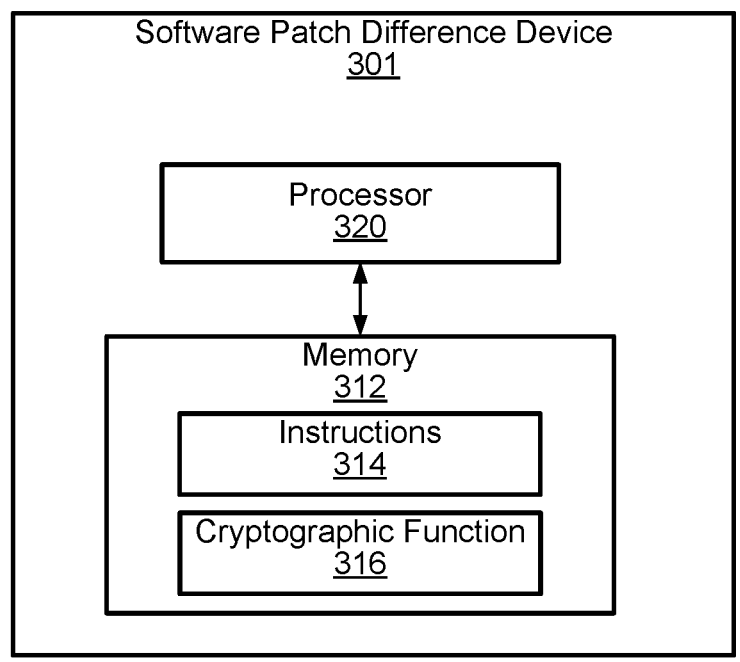
FIG. 3 is a block diagram of an example software patch difference device.

Attention is next directed to FIG. 3 which schematically depicts a software patch difference device 301 to determine monitored devices updated since a last poll. The software patch difference device 301 comprises: a memory 312 storing instructions 314. The software patch difference device 301 further comprises a processor 320 connected to the memory 312, the processor 320 to execute the instructions 314. The instructions 314 control the processor 320 to: receive current software version indicators of software installed at monitored devices. The instructions 314 further control the processor 320 to: generate, using a cryptographic function 316 (e.g. also stored at the memory 312), respective identifiers of the current software version indicators for the monitored devices. The instructions 314 further control the processor 320 to: retrieve, from a storage device, respective previous identifiers of previous software version indicators of the software installed at the monitored devices, the respective previous identifiers generated using the cryptographic function 316. The instructions 314 further control the processor 320 to: compare, for the current software version indicators, a respective identifier with a respective previous identifier The instructions 314 further control the processor 320 to: when a difference is determined therebetween (e.g. between a respective identifier with a respective previous identifier) for a given monitored device: replace, at the storage device, respective previous software version indicators for the given monitored device with respective current software version indicators. The instructions 314 further control the processor 320 to: when a difference is determined therebetween (e.g. between a respective identifier with a respective previous identifier) for a given monitored device: transmit, to a software patch analytics device, a respective software change indicator of the given monitored device, to trigger the software patch analytics device to generate a report indicating statistics for respective software versions installed at the monitored devices.

For example, the software patch difference device 301, may comprise a server, a cloud computing device, and the like, in communication with the polling computing device 101 and a software patch analytics device, via communication networks and the like. Hence, while not depicted, the software patch difference device 301 may comprise a communications interface, and the like, to communicate with communication networks.

Indeed, the software patch difference device 301 may be operated by a same entity operating the polling computing device 101, for example in a DaaS environment.

The memory 312 is coupled to the processor 320 and includes a non-transitory machine-readable storage medium that may be any electronic, magnetic, optical, or other physical storage device. The non-transitory machine-readable storage medium of the memory 312 may include, for example, random access memory (RAM), electrically-erasable programmable read-only memory (EEPROM), flash memory, a storage drive, an optical disc, and the like. The memory 312 may also be encoded with executable instructions to operate and other hardware in communication with the processor 320 (e.g. such as a communications interface). In other examples, it is to be appreciated that the memory 312 may be substituted with a cloud-based storage system.

The memory 312 may also store an operating system that is executable by the processor 320 to provide general functionality to the software patch difference device 301, for example, functionality to support various applications such as a user interface to access various features of the software patch difference device 301. Examples of operating systems include a Real-Time Operating System (RTOS), Windows™, macOS™, iOS™, Android™, Linux™, and Unix™. The memory 312 may additionally store applications that are executable by the processor 320 to provide specific functionality to the software patch difference device 301, such as those described in greater detail below and which may include the instructions 314.

The processor 320 may include a central processing unit (CPU), a microcontroller, a microprocessor, a processing core, a field-programmable gate array (FPGA), or similar. The processor 320 and memory 312 may cooperate to execute various instructions such as the instructions 314.

In some examples, the cryptographic function 316 comprises a hash function, however any suitable cryptographic function is within the scope of the present specification.

In yet further examples, the instructions 314 may further control the processor 320 to: partition the current software version indicators, and generate, using the cryptographic function 316, a sub-identifier for partitioned portions of the current software version indicators. In these examples, the instructions 314 may further control the processor 320 to implement the comparing, for the current software version indicators, the respective identifier with the respective previous identifier by comparing the sub-identifier of the partitioned portions with a respective sub-identifier of a respective partitioned portion of the respective previous identifiers.

In yet further examples, the instructions 314 may further control the processor 320 to: communicate with a list of installing software identifiers of respective software that is it to be installed or updated at the monitored devices. In these examples, the instructions 314 may further control the processor 320 to: when the difference is determined for the given monitored device, include, with the respective software change indicator, the installing software identifiers as determined from the list.

In yet further examples, the instructions 314 may further control the processor 320 to: generate respective software change indicators for a subset of the monitored devices when a difference is determined between the respective identifier with the respective previous identifier. In these examples, the instructions 314 may further control the processor 320 to: transmit the respective software change indicators for the subset to the software patch analytics device.

In yet further examples, the instructions 314 may further control the processor 320 to: include, with the respective software change indicator, a device identifier of the given monitored device, as described above.

In yet further examples, the instructions 314 may further control the processor 320 to: include, with the respective software change indicator, a company identifier associated with the given monitored device, as described above.

In yet further examples, the storage device comprises a no-SQL (Structured Query Language) data store, and the instructions 314 further control the processor 320 to: communicate with the no-SQL data store.

Figure 4:
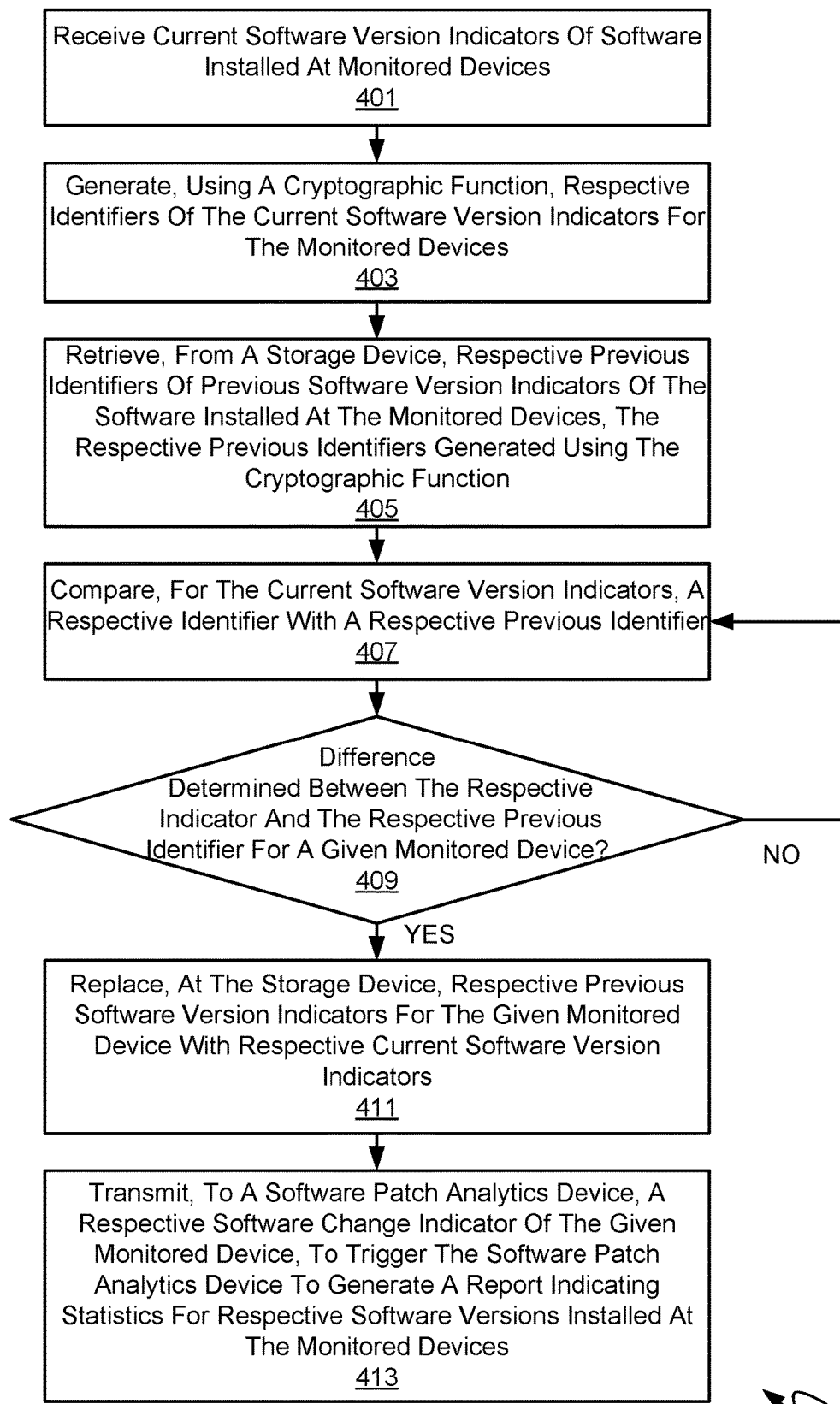
FIG. 4 is a flowchart of an example method to determine which of monitored devices have been updated since a last poll based on current software version indicators.

Referring to FIG. 4, a flowchart of a method 400 to determine monitored devices updated since a last poll is depicted. In order to assist in the explanation of method 400, it will be assumed that method 400 may be performed with the software patch difference device 301, and specifically by the processor 320 implementing the instructions 314. Indeed, the method 400 may be one way in which software patch difference device 301 determines monitored devices updated since a last poll. Furthermore, the following discussion of method 400 may lead to a further understanding of the processor 320, the software patch difference device 301 and its various components. Furthermore, it is to be emphasized, that method 400 may not be performed in the exact sequence as shown, and various blocks may be performed in parallel rather than in sequence, or in a different sequence altogether.

Beginning at a block 401, the software patch difference device 301 receives current software version indicators of software installed at monitored devices. For example, the current software version indicators may be received from the polling computing device 101. The current software version indicators for a given monitored device may be received with device identifiers of the monitored devices and/or company identifiers (and/or names) associated with the monitored device, as described above.

At a block 403, the software patch difference device 301 generates, using a cryptographic function 316, respective identifiers of the current software version indicators for the monitored devices. The cryptographic function 316 may be a hash function and/or any other suitable cryptographic function to generate unique and/or computationally unique identifiers of the current software version indicators. For example when a current software version indicator for a given monitored device comprises a list of respective names and respective version numbers for software applications installed at the given monitored device (including, but not limited to, software patches installed at the given monitored device), the list may be input into a hash function may be used to generate a respective identifier (e.g. a hash) of the current software version indicators for the given monitored device.

At a block 405, the software patch difference device 301 retrieves, from a storage device, respective previous identifiers of previous software version indicators of the software installed at the monitored devices, the respective previous identifiers generated using the cryptographic function 316. For example, previous identifiers of previous software version indicators of the software installed at the monitored devices may have been received at the software patch difference device 301 in a previous iteration of the method 400 and stored at the storage device; during this previous iteration, the cryptographic function 316 may have been used to similarly generate the previous identifiers of previous software version indicators (which, during the previous iteration, would have been current software version indicators).

At a block 407, the software patch difference device 301 compares, for the current software version indicators, a respective identifier with a respective previous identifier. For example, at the block 407, the software patch difference device 301 compares a respective indicator and a respective previous identifier for the monitored devices from which respective current software version indicators are received, for example on a one-to-one basis.

At a block 409, the software patch difference device 301 determines whether there is difference between a respective identifier and a respective previous identifier for a given monitored device. When no difference is determined therebetween (e.g. a "NO" decision at the block 409), the patch difference device 301, at the block 407, continues to compare respective identifiers with respective previous identifiers for the monitored devices from which respective current software version indicators are received.

However, when a difference is determined therebetween for a given monitored device (e.g. a "YES" decision at the block 409), at a block 411, the software patch difference device 301 replaces, at the storage device (e.g. at which the respective previous identifiers were retrieved), respective previous software version indicators for the given monitored device with respective current software version indicators.

Furthermore, at the block 413, the software patch difference device 301 transmits, to a software patch analytics device, a respective software change indicator of the given monitored device, to trigger the software patch analytics device to generate a report indicating statistics for respective software versions installed at the monitored devices. The respective software change indicator may be transmitted with a device identifier and/or an associated company identifier, as described above In some examples, the respective software change indicator transmitted at the block 413 may include the current software version indicators for software installed at the given monitored device.

In other examples, the software patch difference device 301 may be in communication with a list of installing software identifiers of respective software that is it to be installed or updated at the monitored devices (e.g. the list may be stored at a device and the software patch difference device 301 may be in communication with the device that stores the list and/or a queue of installing software updates used to generate the list). When the difference is determined for the given monitored device, the respective software change indicator transmitted at the block 413 may include, with the respective software change indicator, the installing software identifiers as determined from the list, for example to indicate software queued to be installed, and/or which is expected to be installed, at the given monitored device. The software to be installed at the monitored devices, as determined from the list, may be on a company-by-company basis.

While not depicted, the blocks 407 to 413 may be repeated in a loop until the comparison occurs for the monitored devices from which respective current software version indicators are received.

Furthermore, while implementing the method 400 the software patch difference device 301 may: generate respective software change indicators for a subset of the monitored devices when a difference is determined between the respective identifier with the respective previous identifier; and transmit the respective software change indicators for the subset to the software patch analytics device.

For example, while implementing the blocks 407 to 413 of the method 400 the software patch difference device 301 may: compare, for the current software version indicators, a respective identifier with a respective previous identifier. When a difference is determined therebetween for a subset of the monitored devices, the software patch difference device 301 may: replace, at the storage device, respective previous software version indicators for the subset of the monitored devices with respective current software version indicators. The software patch difference device 301 also transmits, to a software patch analytics device, respective software change indicators of the subset of the monitored devices, to trigger the software patch analytics device to generate a report indicating statistics for respective software versions installed at the monitored devices. In general, no information may be transmitted for the monitored devices that are outside of the subset.

Hence, in general, the software patch difference device 301 may filter the current software version indicators received from the polling computing device 101 such that respective software change indicators are transmitted for the subset of the monitored devices (e.g. which may include the current software version indicators for the subset of the monitored devices), while no information is transmitted for the monitored devices that are outside of the subset. Hence, respective software change indicators (and the current software version indicators), are transmitted to the software patch analytics device for the monitored devices on which software version changes have occurred since a previous polling of the monitored devices, while no information is transmitted for the monitored devices on which software version changes have not occurred since the previous polling of the monitored devices.

As a result, the software patch analytics device receives data for the monitored devices on which software version changes have occurred since a previous polling of the monitored devices. As the number of monitored devices may be in the millions, such an approach may reduce the processing time at the software patch analytics device for generating a report.

Furthermore, when a given monitored device is first enrolled and/or has not been previously polled, and the software patch difference device 301 receives current software version indicators of software installed at the given device (e.g. for the first time), the storage device which stores respective previous identifiers of previous software version indicators of the software installed at the monitored devices will not have a record for the given monitored device. This also results in a "YES" decision at the block 409 (e.g. the blocks 405 and 407 may include retrieving a null set from the storage device and comparing the respective identifier of the current software version indicators for the given device to the null set, which results in a "YES" decision at the block 409), such that the block 411 includes generating and populating a record at the storage device for the given monitored device.

Similarly, in these examples, when a given monitored device is first enrolled and/or has not been previously polled, and the software patch difference device 301 receives current software version indicators of software installed at the given device (e.g. for the first time), the block 413 results in a respective software change indicator (and the current software version indicators) being transmitted to the software patch analytics device such that a record of the given monitored device (e.g. which may include the current software version indicators) may be generated.

Figure 5:
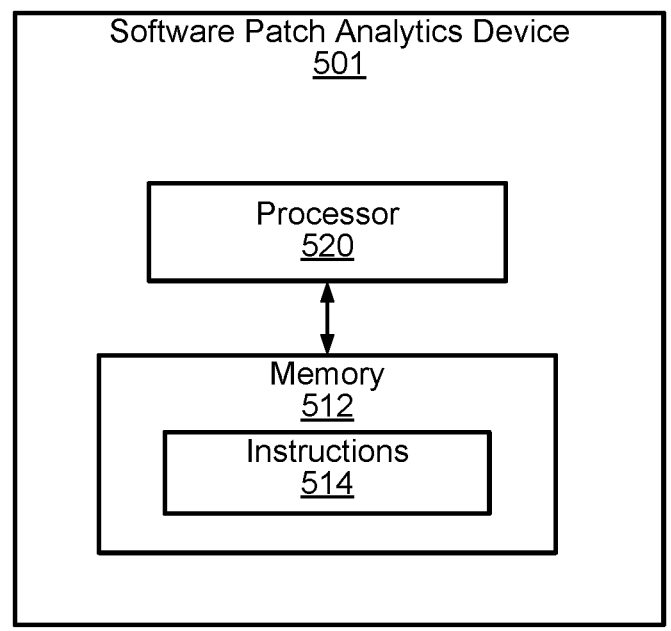
FIG. 5 is a block diagram of an example software patch analytics device.

Attention is next directed to FIG. 5 which schematically depicts a software patch analytics device 501 to generate a report indicating statistics for respective software versions of software installed at monitored devices. The software patch analytics device 501 comprises: a memory 512 storing instructions 514. The software patch analytics device 501 further comprises a processor 520 connected to the memory 512, the processor 520 to execute the instructions 514. The instructions 514 control the processor 520 to: receive, from the software patch difference device 301, respective software change indicators for a subset of monitored devices. The subset includes the monitored devices on which software version changes have occurred since a previous polling of the monitored devices. The respective software change indicators include current software version identifiers of the software installed at the monitored devices of the subset. The instructions 514 further control the processor 520 to: in response to receiving the respective software change indicators: update a storage device (e.g. a different storage device than that described above with respect to the software patch difference device 301) with the current software version identifiers for the subset the monitored devices. The instructions 514 further control the processor 520 to: in response to receiving the respective software change indicators: retrieve, from a software version storage device, available software version indicators of the software installed at the monitored devices. The instructions 514 further control the processor 520 to: in response to receiving the respective software change indicators: generate a report indicating statistics for respective software versions installed at the monitored devices by comparing the available software version indicators with the current software version identifiers for the subset of the monitored devices. The instructions 514 further control the processor 520 to generate the report by comparing the available software version indicators with the previously determined software version indicators for the monitored devices outside of the subset. The instructions 514 further control the processor 520 to: in response to receiving the respective software change indicators: transmit, the report to a communication device of the software service agent to troubleshoot issues identified in the report, which may include the communication device being a software update device which automatically updates the software installed at the monitored devices with available software versions.

For example, the software patch analytics device 501, may comprise a server, a cloud computing device, and the like, in communication with the software patch difference device 301, via communication networks and the like. Hence, while not depicted, the software patch analytics device 501 may comprise a communications interface, and the like, to communicate with communication networks.

Indeed, the software patch analytics device 501 may be operated by a same entity operating the polling computing device 101 and the software patch difference device 301, for example in a DaaS environment.

The memory 512 is coupled to the processor 520 and includes a non-transitory machine-readable storage medium that may be any electronic, magnetic, optical, or other physical storage device. The non-transitory machine-readable storage medium of the memory 512 may include, for example, random access memory (RAM), electrically-erasable programmable read-only memory (EEPROM), flash memory, a storage drive, an optical disc, and the like. The memory 512 may also be encoded with executable instructions to operate and other hardware in communication with the processor 520 (e.g. such as a communications interface). In other examples, it is to be appreciated that the memory 512 may be substituted with a cloud-based storage system.

The memory 512 may also store an operating system that is executable by the processor 520 to provide general functionality to the software patch analytics device 501, for example, functionality to support various applications such as a user interface to access various features of the software patch analytics device 501. Examples of operating systems include a Real-Time Operating System (RTOS). Windows™, macOS™, iOS™, Android™, Linux™, and Unix™. The memory 512 may additionally store applications that are executable by the processor 520 to provide specific functionality to the software patch analytics device 501, such as those described in greater detail below and which may include the instructions 514.

The processor 520 may include a central processing unit (CPU), a microcontroller, a microprocessor, a processing core, a field-programmable gate array (FPGA), or similar. The processor 520 and memory 512 may cooperate to execute various instructions such as the instructions 514.

In some examples, the report generated by the software patch analytics device 501 is to cause the software installed at the monitored devices to be automatically updated with available software versions. For example, the instructions 514 may further cause the processor 520 to transmit the report to a software update device.

The software update device is to: receive the report from the software patch analytics device 501; and, in response, automatically update the software installed at the monitored devices with available software versions.

In some of these examples, the software update device is to: receive the report from the software patch analytics device 501; and, in response, automatically update the software installed at the monitored devices with available software versions where the software installed is not an available software version, as determined from the report.

In yet further examples, the software update device is to: receive the report from the software patch analytics device; and, in response, automatically update the monitored devices where the software installed is not an available software version, as determined from the report, and as determined on a company-by-company basis, the monitored devices associated with companies.

In some examples, the instructions 514 may further control the processor 520 to: include, in the report, a list of the monitored devices that are missing given software patches.

In other examples, the instructions 514 may further control the processor 520 to: include, in the report, company identifiers of companies associated with the monitored devices. In yet further examples, the instructions 514 are further to: filter out information from the report for the software for which available software version indicators are not available.

The report may include various statistics. In some examples, the report includes a list of the monitored devices that are missing given software patches, for at least a given time period, the list sorted by numbers of missing software patches at the monitored devices.

In other examples, the report includes a list of the monitored devices that are missing given software patches, for at least a given time period, the list sorted by numbers of missing software patches at the monitored devices.

In yet further examples, the report includes a list of the software installed at the monitored devices sorted by numbers of the monitored devices missing software patches.

In yet further examples, the report includes a list of the software installed at the monitored devices sorted by numbers of days that the monitored devices are missing the software patches.

Figure 6:
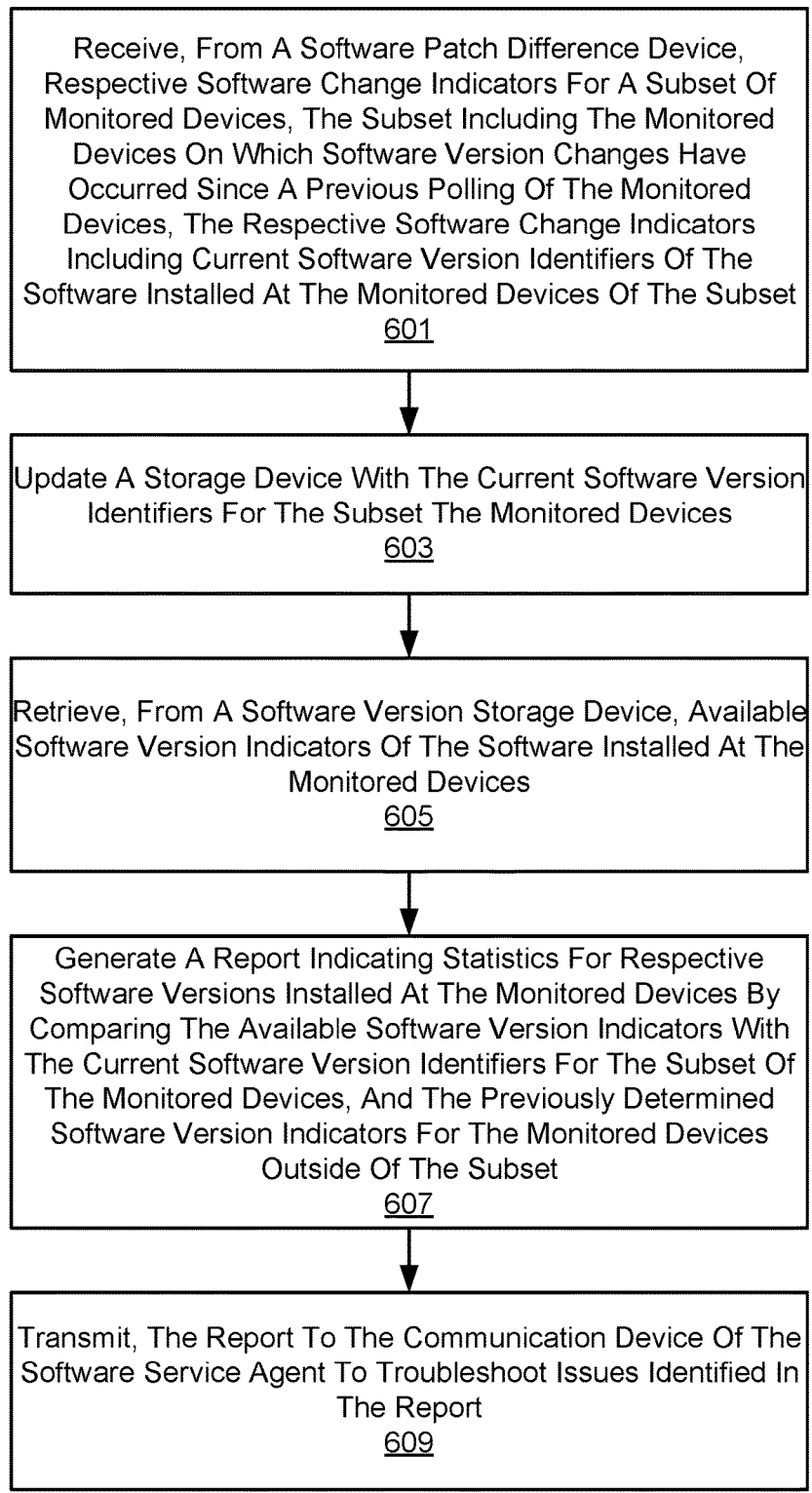
FIG. 6 is a flowchart of an example method to generate a report indicating statistics for respective software versions installed at monitored devices.

Referring to FIG. 6, a flowchart of a method 600 to generate a report indicating statistics for respective software versions of the software installed at the monitored devices is depicted. In order to assist in the explanation of method 600, it will be assumed that method 600 may be performed with the software patch analytics device 501, and specifically by the processor 520 implementing the instructions 514. Indeed, the method 600 may be one way in which software patch analytics device 501 determines monitored devices updated since a last poll. Furthermore, the following discussion of method 600 may lead to a further understanding of the processor 520, the software patch analytics device 501 and its various components. Furthermore, it is to be emphasized, that method 600 may not be performed in the exact sequence as shown, and various blocks may be performed in parallel rather than in sequence, or in a different sequence altogether.

At a block 601, the software patch analytics device 501 receives, from the software patch difference device 301, respective software change indicators for a subset of monitored devices. The subset includes the monitored devices on which software version changes have occurred since a previous polling of the monitored devices. The respective software change indicators include current software version identifiers of the software installed at the monitored devices of the subset. Hence, the software patch analytics device 501 receives software change indicators (e.g. with as described above with current software version indicators, device identifiers, company identifiers and the like) from the software patch difference device 301 as described above. As the software patch difference device 301 may not transmit information for the monitored devices on which software version changes have not occurred since the previous polling of the monitored devices, the software patch analytics device 501 may generate a report (as described below) in a more efficient manner than if information were received from the software patch difference device 301 for all the monitored devices, regardless of whether a software version change has occurred, or not occurred, since the previous polling.

At a block 603, the software patch analytics device 501, in response to receiving the respective software change indicators: updates a storage device (e.g. a different storage device than that described above with respect to the software patch difference device 301) with the current software version identifiers for the subset the monitored devices. When current software version identifiers for a given monitored device is received for a first time, the block 603 may include generating a record for that given monitored device at the storage device.

At a block 605, the software patch analytics device 501 retrieves, from a software version storage device, available software version indicators of the software installed at the monitored devices. For example, the software version storage device may store available software version indicators, which may be regularly updated, for example as new versions and/or patches and/or updates are released for the software installed at the monitored devices.

At a block 607, the software patch analytics device 501 generates a report indicating statistics for respective software versions installed at the monitored devices by comparing the available software version indicators with the current software version identifiers for the subset of the monitored devices. The software patch analytics device 501 further generates the report by comparing the available software version indicators with the previously determined software version indicators for the monitored devices outside of the subset. The report may include various types of statistics as described above, as well as any other suitable types of statistics.

At a block 609, the software patch analytics device 501 transmits the report to a communication device of the software service agent to troubleshoot issues identified in the report. In these examples, the communication device may be a software update device and/or the software service agent may be an automated software service agent. Regardless, the report may cause the software installed at the monitored devices to be automatically updated with available software versions. In some examples, the software update device and/or the automated software service agent may cause the monitored devices to be updated based on the report.

Figure 7:
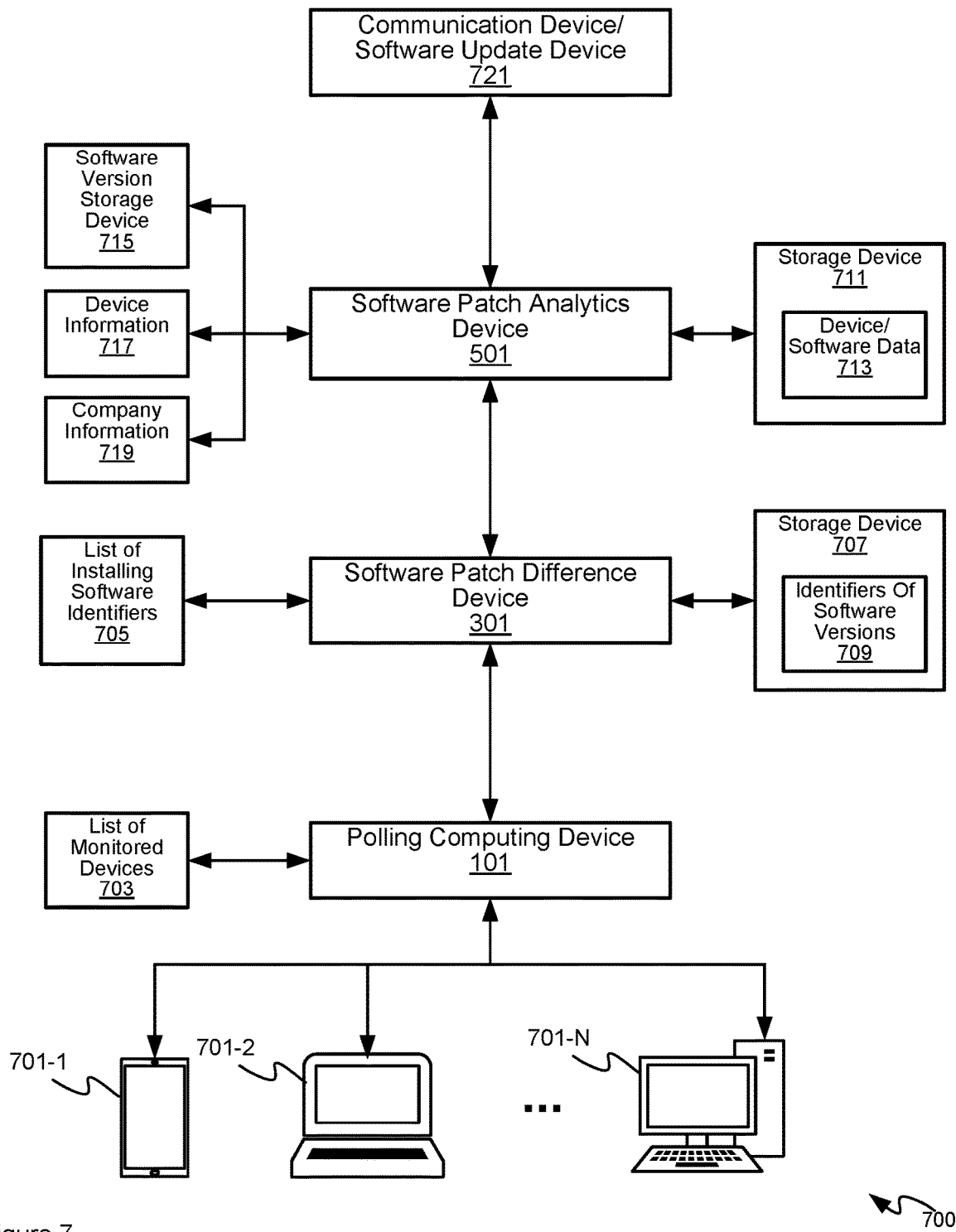
FIG. 7 is a block diagram of an example system of computing devices to control software patches.

Attention is next directed to FIG. 7 which depicts a system 700 of control software updates. The system 700 includes: the polling computing device 101; the software patch analytics device 501; and the software patch difference device 301 in communication with the polling computing device 101 and the software patch analytics device 501. While components of the devices 101, 301, 501 are not depicted (e.g. as in FIGS. 1, 3 and 5), they are nonetheless understood to be present.

In general the components of the system 700 are in communication via communication networks. While such communication networks are not depicted in FIG. 7, communication links between the various components of the system 700 are depicted as double-headed arrows. Such communication links may be wired and/or wireless as desired and/or may include any suitable number of communication networks.

The system 700 further comprises a plurality of monitored devices 701-1, 701-2 ... 701-N (interchangeably referred to hereafter, collectively, as the monitored devices 701 and, generically, as a monitored device 701). The monitored devices 701 may comprise any suitable combination of smart phones, laptop computers, personal computers, and the like, which may communicate with the polling computing device 101, for example via communications networks and/or via an applications programming interface (API) of a polling application installed at the monitored devices 701.

While three monitored devices 701 are depicted in FIG. 7 (e.g. N=3), the number "N" of monitored devices 701 of the system 700 may be in the millions. While not all the monitored devices 701 have the same software applications installed, a number of software applications installed across the monitored devices 701 may be in the hundreds, thousands, or higher.

Furthermore, different monitored devices 701 may be associated with different companies, all of which may have different requirements for when software is updated and/or what versions and/or what software patches are to be installed at the monitored devices 701. Maintaining such software applications may be a daunting task for a single company. Hence, companies may outsource such maintenance to an entity offering DaaS services; maintaining such software applications may be an even greater task in such DaaS environments.

Hence, in some examples, each of the computing devices 101, 301, 501 of the system 700 may be operated by a DaaS entity and/or in a DaaS environment to control software updates across the monitored devices 701.

As described above, the polling computing device 101 is to: poll the monitored devices 701 to receive current software version indicators of software installed at the monitored devices 701; and transmit, to the software patch difference device 301, the current software version indicators.

The software patch difference device 301 is to: determine which of the monitored devices 701 have been updated since a last poll based on the current software version indicators; and transmit, to the software patch analytics device 501, respective software change indicators for the monitored devices 701 that have been updated since the last poll. Hence, the software patch difference device 301 acts as a filter between the polling computing device 101 and the software patch analytics device 501 to transmit, for example, respective software change indicators for a subset of the monitored devices 701. The subset includes the monitored devices 701 on which software version changes have occurred since a previous polling of the monitored devices 701. The respective software change indicators include current software version identifiers of the software installed at the monitored devices 701 of the subset.

The software patch analytics device 501 is to: in response to receiving the respective software change indicators for the monitored devices 701 that have been updated since the last poll, generate a report indicating statistics for respective software versions of the software installed at the monitored devices 701.

As depicted, the polling computing device 101 is in communication with a list 703 of the monitored devices 701

(e.g. which may be stored at a storage device and/or maintained at the memory 112) and which may be used to generate the queue of monitored devices 701 described above with respect to the method 200. The list 703 may include identifiers of the monitored devices 701 and may be updated as the monitored devices 701 are removed or added to the system 700, for example by receiving lists of identifiers the monitored devices 701 on a company-by-company basis from company computing devices, and the like.

As depicted, the software patch difference device 301 is in communication with a list 705 of installing software identifiers (e.g. which may be stored at a storage device and/or maintained at the memory 312). The list 705 of installing software identifiers may comprise a list of versions and/or current patches that are queued to be installed at the monitored devices 701 and/or expected to be installed at the monitored devices 701; for example, the list 705 may be generated from, and/or comprise, a queue of software updates to be installed at the monitored devices 701.

As depicted, the software patch difference device 301 is in further communication with a storage device 707 storing identifiers 709 of previous software version indicators of the monitored devices 701. The storage device 707 may comprise a no-SQL storage device. For example, the identifiers 709 may have been generated and stored at the storage device 707 in a previous polling of the monitored devices 701, for example using the cryptographic function 316. Hence, the identifiers 709 may comprise hashes of previous software version indicators of the monitored devices 701.

As depicted, the software patch analytics device 501 is in communication with a storage device 711 storing device and/or software data 713. The storage device 711 may comprise databases and/or "big data" storage devices that store: previously received software version identifiers of the software installed at the monitored devices 701 (e.g. as received from the software patch difference device 301). The storage device 711 may further store: identifiers of available versions of the software installed at the monitored devices 701 which may or may not be the same as the current versions of the software installed at the monitored devices 701.

For example, as depicted, the software patch analytics device 501 is in communication with the software version storage device 715 which stores identifiers of available versions of the software installed at the monitored devices 701 (i.e. regardless whether such available versions are installed and/or the same as the current versions of the software installed at the monitored devices 701). For example, the identifiers of available versions of the software installed at the monitored devices 701 may include, but are not limited, identifiers of software patches and/or whether such software patches are mandatory (e.g. on a company-by-company basis) and/or classified according to any suitable scheme. For example, the software patches may be classified as being mandatory or preferably installed or optional, and the like.

As depicted, the software patch analytics device 501 is in communication with a device storing device information 717, which may comprise identifiers of the monitored devices 701, similar to the list 703 of monitored devices 701. However, the device information 717 may comprise a data source from which identifiers of newly enrolled or unenrolled monitored devices 701 is received. For example, a newly enrolled monitored device 701 may be a monitored device 701 added to the system 700 so that DaaS services may be provided thereto, and a newly unenrolled monitored device 701 may be a monitored device 701 removed from the system 700. Such identifiers may be used to generate or delete records for a newly enrolled or unenrolled monitored device 701 at the storage device 711.

As depicted, the software patch analytics device 501 is in communication with a device storing company information 719, which may comprise identifiers of companies added to or removed from the system 700, or, more specifically, identifiers of companies associated with monitored devices 701 for which DaaS services are newly being provided or removed. Such identifiers may be used to generate a record for an added or removed company at the storage device 711 and/or to associate records of the monitored devices at the storage device 711 with respective companies.

As depicted, the software patch analytics device 501 is in communication with a communication device and/or software update device 721 to which reports generated by the software patch analytics device 501 are transmitted. The communication device and/or software update device 721 may be associated with a software agent and/or an automated software agent and may automatically update the monitored devices 701 based on a report received from the software patch analytics device 501.

Figure 8:
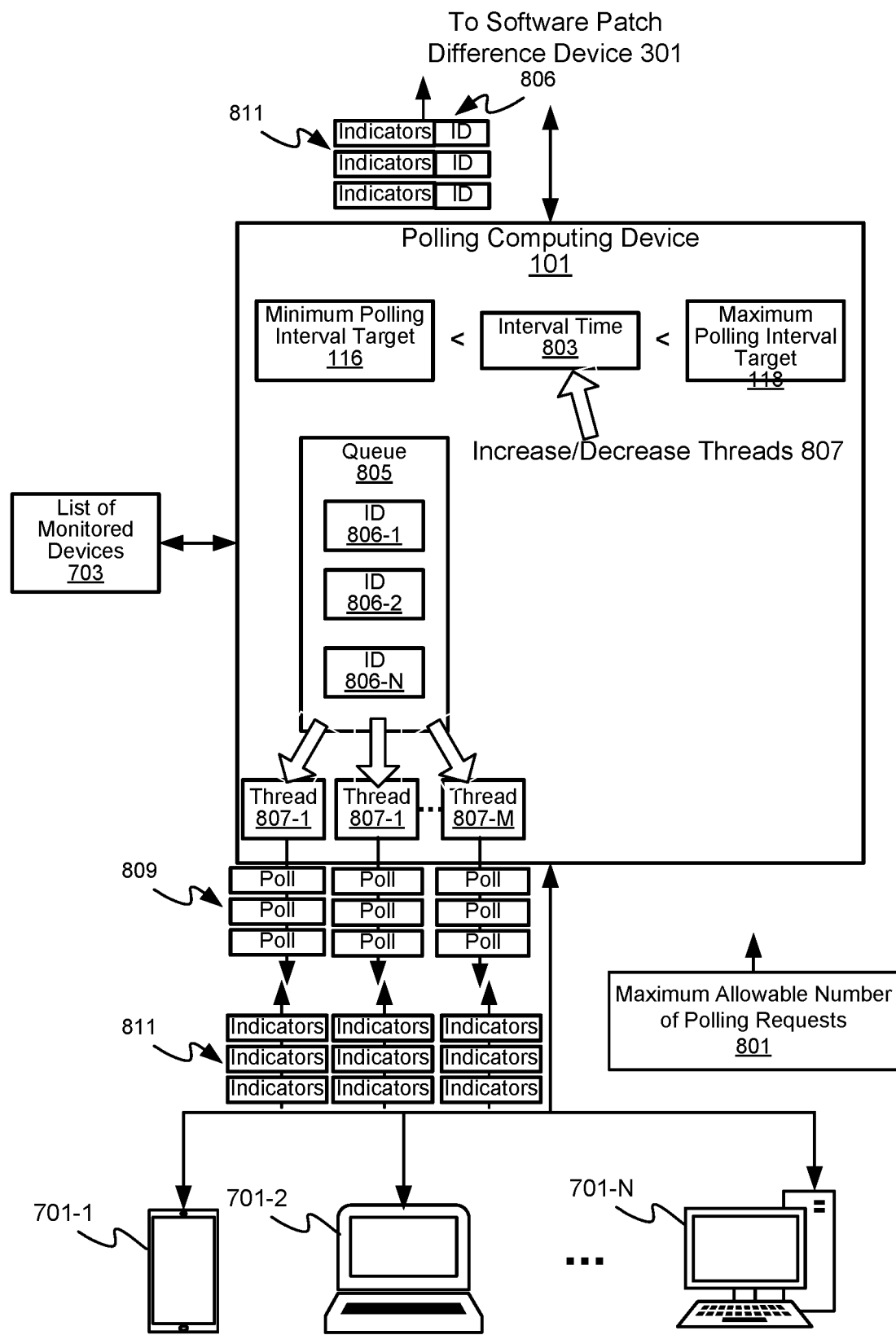
FIG. 8 shows a portion of the system of FIG. 7 showing operations at an example polling computing device.
Figure 9:
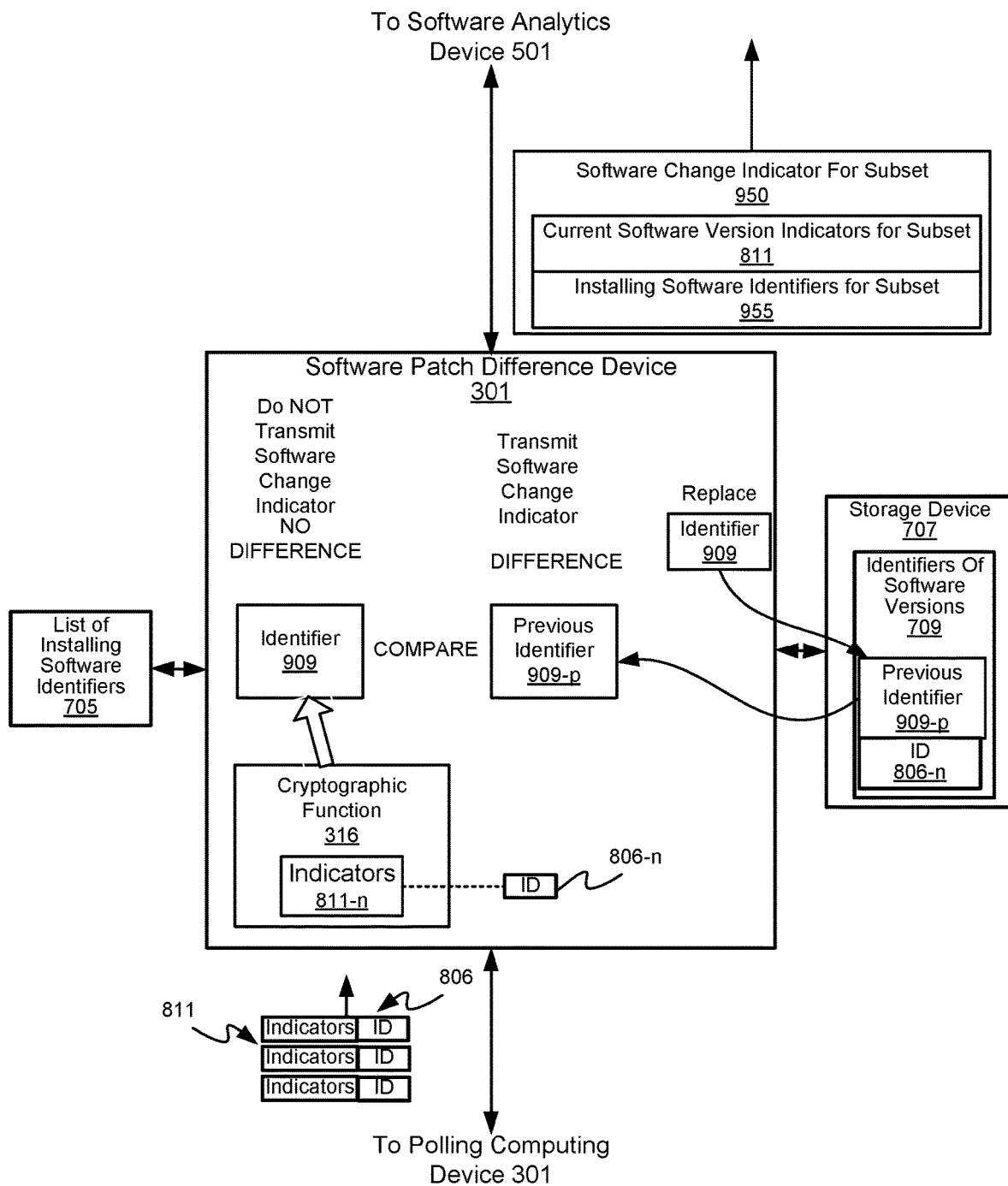
FIG. 9 shows a portion of the system of FIG. 7 showing operations at an example software patch difference device.
Figure 10:
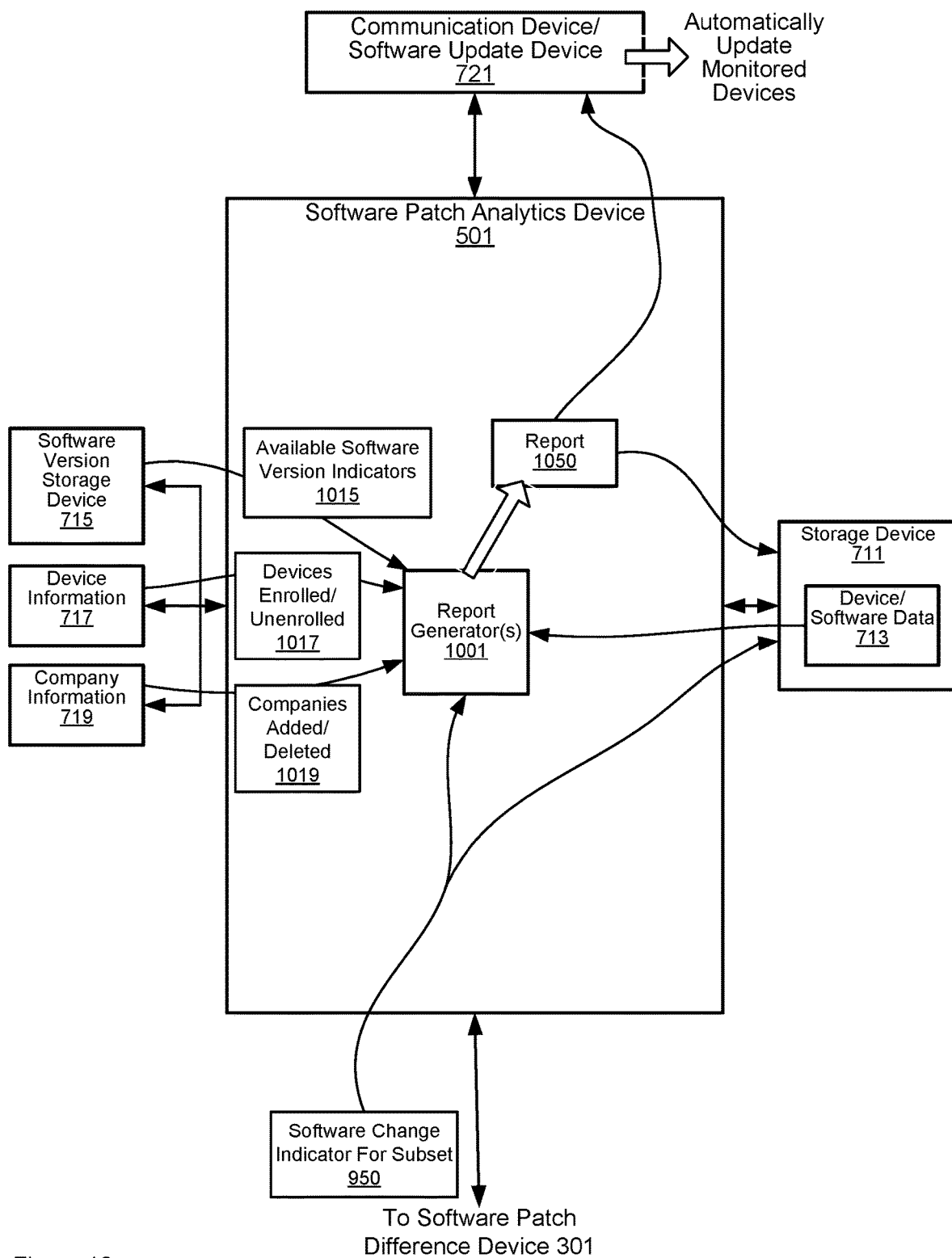
FIG. 10 shows a portion of the system of FIG. 7 showing operations at an example software patch analytics device.

The operation of the system 700 are now described with respect to FIG. 8, FIG. 9, and FIG. 10.

Attention is next directed to FIG. 8 which depicts a portion of the system 700 which relates to operation of the polling computing device 101. In particular, in FIG. 8, the polling computing device 101 is receiving, from an application and/or a polling application at the monitored devices 701, a maximum allowable number 801 of polling requests which may be used to determine the minimum polling interval target 116, for example, by dividing the maximum allowable number 801 of polling requests by the number "N" of the monitored devices 701.

The polling computing device 101 may further determine an interval time 803 to poll a monitored device 701 in a queue 805 of the monitored devices 701 based on a current processing time of a given monitored device 701 being polled. The polling computing device 101 may further determine an average processing time for previously polled monitored devices 701, for example to determine a moving average of a processing time for polling a monitored device 701. In particular, as depicted in FIG. 8, the polling computing device 101 has generated the queue 805 of the monitored devices 701, for example by receiving identifiers 806-1, 806-2, 806-N (interchangeably referred to, collectively, as the identifiers 806 and, generically, as an identifier 806) of the monitored devices 701 from the list 703 and placing the identifiers of the monitored devices 701 in an order in the queue 805.

For example, as depicted, a first monitored device 701-1 having an identifier 806-1 is polled first, a second monitored device 701-2 having an identifier 806-2 is polled second, and so on, until a last monitored device 701-N having an identifier 806-N is polled. Once the last monitored device 701-N is polled, the first monitored device 701-1 may again be polled, and so on. The time between polling the first monitored device 701-1 a first time, and then again polling the first monitored device 701-1 once all the monitored devices 701 in the queue 805 have been polled (e.g. after the last monitored device 701-N is polled) may be the interval time 803.

Furthermore, as depicted, the polling computing device 101 is operating a plurality of polling threads 807-1, 807-2 . . . 807-M (interchangeably referred to, collectively, as the polling threads 807 and, generically, as a polling thread 807) to poll the monitored devices 701 in parallel.

Hence, for example, a polling thread 807-1 may be used to transmit a poll request 809 to the first monitored device 701-1 while, in parallel, a polling thread 807-2 may be used to transmit a poll request 809 to the second monitored device 701-2, and so on. Hence, in FIG. 8, poll requests 809 are depicted as being transmitted to the monitored devices 701 in parallel on the polling threads 807, with the poll requests 809 being transmitted (e.g. according to a polling rate) in an order on each thread 807 according to the queue 805. In response, the monitored devices 701 return, on the polling threads 807, current software version indicators 811 of software installed at monitored devices 701. Each of the current software version indicators 811 may be time-stamped.

The moving average of a processing time for polling a monitored device 701 may be divided by the number "M" of the polling threads to determine the processing time for polling a monitored device 701 per thread 807. Hence, for example, when there are "M" threads 807, the processing time per thread is the processing time for polling a monitored device 701 divided by "M".

Hence, to determine the interval time 803, the processing time for polling a monitored device 701 per thread 807 may be multiplied by the number "N" of the monitored devices 701.

Furthermore, as also depicted in FIG. 8, the interval time 803 may be adjusted by increasing or decreasing the number "M" of polling threads 807, for example to adjust the interval time 803 to be between the minimum polling interval target 116 and the maximum polling interval target 118. In general, the polling computing device 101 may attempt to poll the monitored devices 701 as quickly as possible (e.g. without causing a CPU burst), and hence the number "M" of polling threads 807 may be adjusted until the interval time 803 is aligned with the minimum polling interval target 116 and specifically adjusted to be equal to the minimum polling interval target 116 plus a buffer time. The buffer time may be determined with respect to number "M" of polling threads 807, for example by adding 10% (and the like) more threads than a number of polling threads 807 which will cause the interval time 803 to be about equal to the minimum polling interval target 116.

Furthermore, in some examples, after the last monitored device 701-N is polled, a wait time may occur before again polling the first monitored device 701-1, for example such that the monitored devices 701 are polled once per day, once per week, and the like (e.g. as represented by the maximum polling interval target 118). Hence, while the interval time 803 represents the time between polling the first monitored device 701-1 a first time and a second time, when the queue 805 is used to immediately again poll the monitored devices 701 after the last monitored device 701-N is polled, the adjusted interval time 803 may be used to adjust the polling rate to be as fast as possible (e.g. such that the interval time 803 is above the minimum polling interval target 116) without necessarily immediately again polling all the monitored devices 701 after the last monitored device 701-N is polled.

However, while FIG. 8 depicts a particular example of adjusting a polling rate of the monitored devices 701, any suitable process for adjusting a polling rate of the monitored devices 701, such the interval time 803 is between the minimum polling interval target 116 and the maximum polling interval target 118, is within the scope of the present specification.

Furthermore, as depicted, the current software version indicators 811 (e.g. as timestamped) for each of the monitored devices 701 are transmitted to the software patch difference device 301, for example with respective device identifiers 806 of the monitored devices 701.

Attention is next directed to FIG. 9 which depicts a portion of the system 700 which relates to operation of the software patch difference device 301. In particular, in FIG. 9, the software patch difference device 301 is receiving the current software version indicators 811 from the polling computing device 101, for example with respective device identifiers 806 of the monitored devices 701.

For each of the current software version indicators 811, software patch difference device 301 generates a respective identifier 909 using the cryptographic function 316. For example, as depicted, the identifier 909 is generated from indicators 811-$n$ associated with a device identifier 806-$n$. In some examples, the respective identifier 909 may comprise a hash of the indicators 811-$n$.

As also depicted in FIG. 9, the storage device 707 stores the identifiers 709 of previous software version indicators 811 received from the polling computing device 101, for example from previous polls of the monitored devices 701. The previous software version identifiers 709 are generally stored in association with respective device identifiers 806 (e.g. the same device identifiers 806 received with the indicators 811) and may comprise hashes of previous software version indicators 811 received in previous polls of the monitored devices 701.

As depicted, the previous software version identifiers 709 include an example previous identifier 909-$p$ stored in association with the device identifier 806-$n$. Hence, for example, the previous identifier 909-$p$ was generated in a similar manner as the identifier 909 (e.g. using the cryptographic function 316), from previously received indicators 811 for a monitored device 701 associated with the device identifier 806-$n$.

Hence, the identifier 909 represents an indication of a current state of the software at the monitored device 701 associated with the device identifier 806-$n$, while the identifier 909-$p$ represents an indication of a previous state of the software at the monitored device 701 associated with the device identifier 806-$n$.

The device identifier 806-$n$ is used to retrieve the identifier 909-$p$ from the storage device 707, and the identifiers 909, 909-$p$ are compared.

When a difference is determined therebetween (e.g. the software at the monitored device 701 associated with the device identifier 806-$n$ has changed and/or been updated since the identifier 909-$p$ was generated), a software change indication 950 is transmitted to the software patch analytics device 501 for the monitored device 701 associated with the device identifier 806-$n$, and the previous identifier 909-$p$ is replaced at the storage device 707 with the identifier 909, such that the storage device 707 stores an indication of the current state of the software at the monitored device 701 associated with the device identifier 806-$n$.

However, when no difference is determined therebetween (e.g. the identifiers 909, 909-$p$ are the same, and hence the software at the monitored device 701 associated with the device identifier 806-$n$ has not changed and/or not been updated since the identifier 909-$p$ was generated), a software change indication 950 is not transmitted to the software patch analytics device 501 for the monitored device 701 associated with the device identifier 806-$n$, and furthermore the identifier 909-$p$ is not replaced at the storage device 707.

The generation of identifiers 909 for each of the received indicators 811 proceeds in a similar manner (e.g. in a loop, until the indicators 811 are used to generate respective identifiers 909), and hence the software patch difference device 301 maintains, at the storage device 707, current indications of the state of the software at the monitored device 701. Furthermore, in this manner, the software patch difference device 301 determines a subset of the monitored devices 701 on which software version changes have occurred since a previous polling of the monitored devices 701.

As depicted, software change indicators 950 are transmitted to the software patch analytics device 501 for the subset, while no such software change indictors are transmitted for monitored device 701 outside of the subset (e.g. on which software version changes have not occurred since a previous polling of the monitored devices 701).

As depicted, the software change indicators 950 transmitted to the software patch analytics device 501 include the current software version indicators 811 (e.g. as timestamped) for the subset of the monitored devices 701 on which software version changes have occurred since a previous polling of the monitored devices 701, which may also be transmitted with respective device identifiers 806. As depicted, the software change indicators 950 transmitted to the software patch analytics device 501 further include the installing software identifiers 955 for the subset (e.g. as received from the list 705) which may also be transmitted with respective device identifiers 806. Hence, for each of the monitored devices 701 in the subset for which software version changes have occurred since a previous polling of the monitored devices 701, a respective software change indicator 950 may be transmitted, each including: a device identifier 806 of a respective monitored device 701, and the current software version indicators 811 of the respective monitored device 701. In some examples (as depicted) the respective software change indicator 950 may further include respective installing software identifiers 955 for the respective monitored device 701. The software change indicators 950 may be transmitted together and/or the comparisons of the identifiers 909 and the previous identifiers 909-*p* occur.

Furthermore, as the polling computing device 101 may poll the monitored devices 701 once per day, once we week, and the like, the operations of the software patch difference device 301 may also occur only once per day, once per week, and the like; hence, in these examples, the software change indicator 950 may also be transmitted to the software patch analytics device 501 once per day, once per week, and the like.

Attention is next directed to FIG. 10 which depicts a portion of the system 700 which relates to operation of the software patch analytics device 501. In particular, in FIG. 10, the software patch analytics device 501 is receiving the software change indicators 950 from the software patch difference device 301.

As depicted, the software patch analytics device 501 is operating a report generator 1001 or report generators (e.g. one report generator and/or different report generators for different types of reports), which may represent the software patch analytics device 501 implementing the instructions 514.

As depicted, the report generator 1001 receives the software change indicators 950 as well as available software version indicators 1015 from the software version storage device 715. As depicted, the report generator 1001 may also receive, from the device information 717, device identifiers 1017 of monitored devices 701 which have been enrolled or unenrolled since a last polling of the monitored devices 701 occurred, and/or the report generator 1001 may also receive company identifiers 1019 of companies which have been added or deleted since a last polling of the monitored devices 701 occurred.

The current software version indicators 811 (e.g. as timestamped and received with the software change indicators 950) for the subset of the monitored devices 701 on which software version changes have occurred since a previous polling of the monitored devices 701 may be used to update the device/software data 713 at the storage device 711. In particular, the current software version indicators 811 may be stored at the storage device 711 and replace any previously received software version indicators 811.

However, the software change indicators 950 which include the current software version indicators 811 are received for the subset of the monitored devices 701 on which software version changes have occurred since a previous polling of the monitored devices 701, and not for other monitored device 701 (e.g. as no software versions have changed). Hence any existing software version indicators 811 at the device/software data 713 is not replaced, such that the device/software data 713 includes both current software version indicators 811 received for the subset and the previously determined software version indicators for the monitored devices 701 outside of the subset, which were previously received.

The report generator 1001 generates a report 1050 indicating statistics for respective software versions installed at the monitored devices 701 indicating statistics for respective software versions installed at the monitored devices 701. The report generator 1001 generates the report 1050 based on the software change indicators 950 (e.g. including the current software version indicators 811 for the subset of the monitored devices 701 on which software version changes have occurred since a previous polling of the monitored devices 701). The report generator 1001 may further generate the report 1050 based on: the available software version indicators 1015 and the previously determined software version indicators for the monitored devices 701 outside of the subset (e.g. as stored in at the storage device 711). The report generator 1001 may further generate the report 1050 based on: the device identifiers 1017 and the company identifiers 1019.

The report 1050 may be generated by at least: comparing the available software version indicators 1015 with the current software version indicators 811 (e.g. as timestamped) for the subset of the monitored devices; and comparing the available software version indicators 1015 with the previously determined software version indicators (e.g. as also timestamped) for the monitored devices 701 outside of the subset.

The report 1050 may include, but is not limited to: a list of the monitored devices 701 that are missing given software patches (e.g. as represented by the available software version indicators 1015), for at least a given time period, the list sorted by numbers of missing software patches at the monitored devices 701 or by numbers of the monitored devices 701 missing software patches. The given time period may be for the last week, the last month, the last year and/or the given time period may be selected (e.g. according to "big data" processes) such that all the data for all the monitored devices 701 are included in the report 1050. Alternatively, the given time period may be selected (e.g. according to "big data" processes) such that a portion of the data for the monitored devices 701 are included in the report 1050, filtered, for example, according to timestamps of the current, or previously determined, software version indicators 811.

Similarly, the report 1050 may include, but is not limited to: list of the software installed at the monitored devices 701 sorted by numbers of the monitored devices missing software patches or sorted by numbers of days that the monitored devices 701 are missing the software patches.

Indeed, in general, the report 1050 may summarize: numbers of monitored devices 701 not patched to a latest software version; monitored devices 701 having the most number of software patches missing; software applications (installed at the monitored devices 701) having most days of non-upgraded devices; monitored devices 701 having most days with unpatched software applications; and the like.

Furthermore, the information the report 1050 may be further sorted by company identifiers, device identifiers, and the like, for example using any of the data received at the report generator 1001.

In some examples, the report 1050 may include visualizations of the data included therein, including, but not limited to, graphs, bar graphs, and the like.

In some examples, the generation of the report 1050 may occur according to "big data" processing and/or databases and the like.

The report 1050 may also be used to identify monitored devices 701 in which mandated software patches have not been installed and/or software installed at the monitored devices 701 which has a poor record of having software patches updated and/or when software patches were installed. In some examples, installing software identifiers 955 for the subset, received with the software change indicators 950, may be used to further filter the data in the report (e.g. to show scheduled software updates) and/or identify software patches that were scheduled to be installed and were not installed at the monitored devices 701. In some of these examples an incident report (which may be part of the report 1050) may be generated to indicate software patches that were scheduled to be installed and were not installed at the monitored devices 701

Furthermore, as depicted, the report 1050 may be transmitted to the software update device 721 which may cause the software installed at the monitored devices 701 to be automatically updated with available software versions. For example, the report 1050 may be used to identify monitored devices 701 missing mandatory software patches such that the software update device 721 causes such mandatory software patches to be installed at the monitored devices 701, and the like. However, any suitable type of software update may occur at the monitored devices 701 via the software update device 721 receiving the report 1050.

It should be recognized that features and aspects of the various examples provided above may be combined into further examples that also fall within the scope of the present disclosure.

The invention claimed is:

1. A software patch difference device comprising:
a memory storing instructions; and
a processor connected the memory, the processor to execute the instructions, the instructions control the processor to:
receive current software version indicators of software installed at monitored devices;
generate, using a cryptographic function, respective identifiers of the current software version indicators for the monitored devices;
retrieve, from a storage device, respective previous identifiers of previous software version indicators of the software installed at the monitored devices, the respective previous identifiers generated using the cryptographic function;
compare, for the current software version indicators, a respective identifier with a respective previous identifier; and, when a difference is determined therebetween for a given monitored device:
replace, at the storage device, respective previous software version indicators for the given monitored device with respective current software version indicators; and
transmit, to a software patch analytics device, a respective software change indicator of the given monitored device, to trigger the software patch analytics device to generate a report indicating statistics for respective software versions installed at the monitored devices,
wherein the statistics comprise one or more of:
a first list of the monitored devices that are missing given software patches, for at least a given time period;
a second list of the monitored devices that are missing the given software patches, for at least the given time period, the second list sorted by numbers of the missing given software patches at the monitored devices;
a third list of the software installed at the monitored devices sorted by numbers of the monitored devices that are missing software patches; and
a fourth list of the software installed at the monitored devices sorted by numbers of days that the monitored devices are missing the software patches.

2. The software patch difference device of claim 1, wherein the cryptographic function comprises a hash function.

3. The software patch difference device of claim 1, wherein the instructions further control the processor to:
partition the current software version indicators, and generate, using the cryptographic function, a sub-identifier for partitioned portions of the current software version indicators; and
wherein the comparing, for the current software version indicators, the respective identifier with the respective previous identifier comprises comparing the sub-identifier of the partitioned portions with a respective sub-identifier of a respective partitioned portion of the respective previous identifiers.

4. The software patch difference device of claim 1, wherein the instructions a further control the processor to:
communicate with a list of installing software identifiers of respective software that is it to be installed or updated at the monitored devices; and, when the difference is determined for the given monitored device, include, with the respective software change indicator, the installing software identifiers as determined from the list.

5. The software patch difference device of claim 1, wherein the storage device comprises a no-SQL (Structured Query Language) data store, and the instructions further control the processor to:
communicate with the no-SQL data store.

6. A non-transitory machine-readable storage medium encoded with instructions executable by a processor of a software patch difference device, the non-transitory machine-readable storage medium comprising the instructions that control the processor to:
receive current software version indicators of software installed at monitored devices;
generate, using a cryptographic function, respective identifiers of the current software version indicators for the monitored devices;
retrieve, from a storage device, respective previous identifiers of previous software version indicators of the software installed at the monitored devices, the respective previous identifiers generated using the cryptographic function;
compare, for the current software version indicators, a respective identifier with a respective previous identifier; and, when a difference is determined therebetween for a given monitored device:
replace, at the storage device, respective previous software version indicators for the given monitored device with respective current software version indicators; and
transmit, to the software patch analytics device, a respective software change indicator of the given monitored device, to trigger the software patch analytics device to generate a report indicating statistics for respective software versions installed at the monitored devices, the respective software change indicator including current software version identifiers of the software installed at the given monitored device,
wherein the statistics comprise one or more of:
a first list of the monitored devices that are missing given software patches, for at least a given time period;
a second list of the monitored devices that are missing the given software patches, for at least the given time period, the second list sorted by numbers of the missing given software patches at the monitored devices;
a third list of the software installed at the monitored devices sorted by numbers of the monitored devices that are missing software patches; and
a fourth list of the software installed at the monitored devices sorted by numbers of days that the monitored devices are missing the software patches.

7. The non-transitory machine-readable storage medium of claim 6, wherein the cryptographic function comprises a hash function.

8. The non-transitory machine-readable storage medium of claim 6, further comprising instructions that control the processor to:
generate respective software change indicators for a subset of the monitored devices when a difference is determined between the respective identifier with the respective previous identifier; and
transmit the respective software change indicators for the subset to the software patch analytics device.

9. The non-transitory machine-readable storage medium of claim 6, further comprising instructions that control the processor to:
include, with the respective software change indicator, a device identifier of the given monitored device.

10. The non-transitory machine-readable storage medium of claim 6, further comprising instructions that control the processor to:
include, with the respective software change indicator, a company identifier associated with the given monitored device.

11. A software patch difference device comprising:
a memory storing instructions; and
a processor connected the memory, the processor to execute the instructions, the instructions control the processor to:
receive, from a software patch analytics device, current software version indicators of software installed at monitored devices;
generate, using a cryptographic function, respective identifiers of the current software version indicators for the monitored devices;
retrieve, from a storage device, respective previous identifiers of previous software version indicators of the software installed at the monitored devices, the respective previous identifiers generated using the cryptographic function;
compare, for the current software version indicators, a respective identifier with a respective previous identifier; and, when a difference is determined therebetween for a subset of the monitored devices:
replace, at the storage device, respective previous software version indicators for the subset of the monitored devices with respective current software version indicators; and
transmit, to a software patch analytics device, respective software change indicators of the subset of the monitored devices, to trigger the software patch analytics device to generate a report indicating statistics for respective software versions installed at the monitored devices, wherein no information is transmitted for the monitored devices that are outside of the subset,
wherein the statistics comprise one or more of:
a first list of the monitored devices that are missing given software patches, for at least a given time period;
a second list of the monitored devices that are missing the given software patches, for at least the given time period, the second list sorted by numbers of the missing given software patches at the monitored devices;
a third list of the software installed at the monitored devices sorted by numbers of the monitored devices that are missing software patches; and
a fourth list of the software installed at the monitored devices sorted by numbers of days that the monitored devices are missing the software patches.

12. The software patch difference device of claim 11, wherein the cryptographic function comprises a hash function.

13. The software patch difference device of claim 11, wherein the instructions further control the processor to:
partition the current software version indicators, and generate, using the cryptographic function, a sub-identifier for partitioned portions of the current software version indicators; and
wherein the comparing, for the current software version indicators, the respective identifier with the respective previous identifier comprises comparing the sub-identifier of the partitioned portions with a respective sub-identifier of a respective partitioned portion of the respective previous identifiers.

14. The software patch difference device of claim 11, wherein the instructions further control the processor to:
communicate with a list of installing software identifiers of respective software that is it to be installed or updated at the monitored devices; and, when the difference is determined for the given monitored device,
include, with the respective software change indicator, the installing software identifiers as determined from the list.

15. The software patch difference device of claim 11, wherein the storage device comprises a no-SQL (Structured Query Language) data store, and the instructions further control the processor to:
communicate with the no-SQL data store.

\* \* \* \* \*